United States Patent [19]
Collins

[11] Patent Number: 5,769,216
[45] Date of Patent: Jun. 23, 1998

[54] HOLDER FOR COMPACT DISC AND THE LIKE

[76] Inventor: William Collins, 30 Durham Rd., New Hyde Park, N.Y. 11040

[21] Appl. No.: 607,647

[22] Filed: Feb. 27, 1996

[51] Int. Cl.⁶ .................................................. B65D 85/30
[52] U.S. Cl. ........................................ 206/308.1; 206/312
[58] Field of Search ............................... 206/307, 308.1, 206/308.3, 312, 309

[56] References Cited

U.S. PATENT DOCUMENTS

| | | |
|---|---|---|
| 2,189,076 | 2/1940 | Liskin ..................................... 206/309 |
| 3,245,691 | 4/1966 | Gorman . |
| 3,595,383 | 7/1971 | Boylan . |
| 4,488,645 | 12/1984 | Yamaguchi . |
| 4,566,590 | 1/1986 | Manning et al. . |
| 4,805,770 | 2/1989 | Grobecker et al. . |
| 4,850,731 | 7/1989 | Youngs . |
| 5,048,681 | 9/1991 | Henkel ................................ 206/308.1 |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,188,229 | 2/1993 | Bernstein . |
| 5,207,717 | 5/1993 | Manning . |
| 5,248,032 | 9/1993 | Sheu et al. ........................... 206/308.1 |
| 5,255,785 | 10/1993 | Mackey ................................ 206/308.3 |
| 5,289,918 | 3/1994 | Dobias et al. . |
| 5,291,990 | 3/1994 | Sejzer . |
| 5,396,987 | 3/1995 | Temple et al. . |
| 5,460,265 | 10/1995 | Kiolbasa .............................. 206/308.1 |
| 5,506,740 | 4/1996 | Harmon .............................. 206/308.3 |

FOREIGN PATENT DOCUMENTS 008702565   5/1989   Netherlands ....................... 206/308.1

*Primary Examiner*—Paul T. Sewell
*Assistant Examiner*—Nhan T. Lam
*Attorney, Agent, or Firm*—Frishauf, Holtz, Goodman, Langer & Chick

[57] ABSTRACT

A package suitable as a mailer for discs such as compact discs and computer floppy discs includes a retention panel, lateral engagement sections and disc retainment tabs. The lateral engagement sections have an arc-like cutout along one edge. The lateral engagement sections are layed upon a portion of the retention panel such that the arc-like cutout of each lateral engagement section substantially corresponds to an edge of the disc. The lateral engagement sections define a space over the retention panel sufficient for accommodating and for providing lateral retention of the disc. The package also includes disc retainment tabs layed over the lateral engagement sections. The disc retainment tabs extend beyond the lateral engagement sections over at least a portion of the first surface of the retention panel to substantially engage at least a portion of a surface of the disc to retain the disc therein.

28 Claims, 4 Drawing Sheets

U.S. Patent Jun. 23, 1998 Sheet 1 of 4 5,769,216
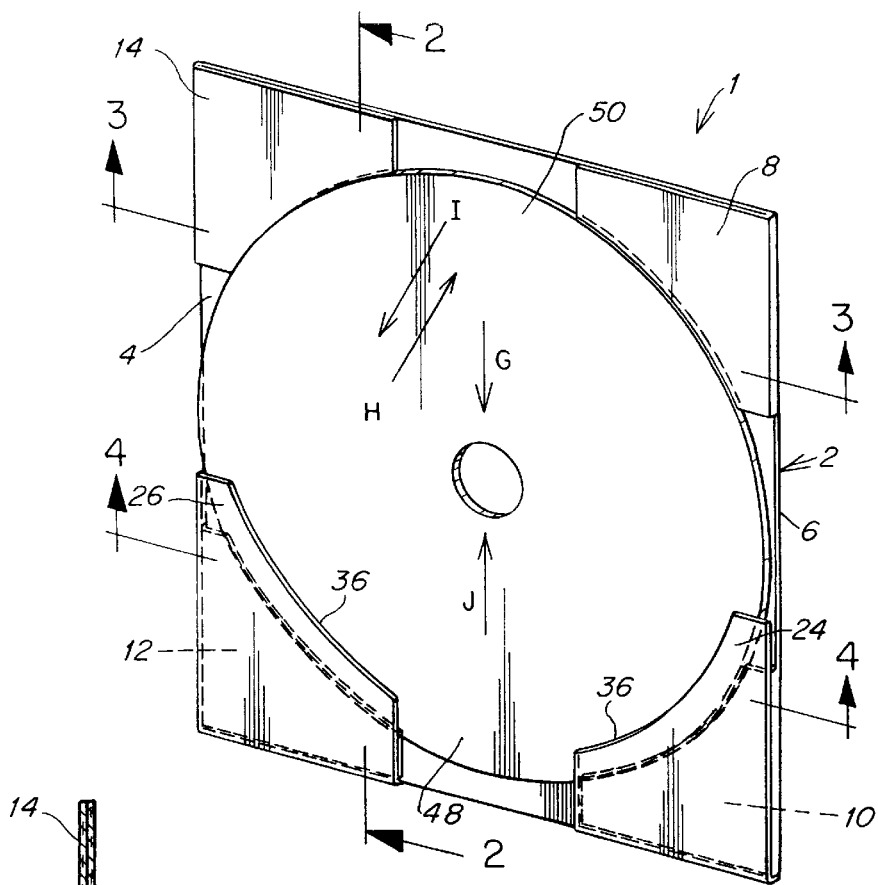
FIG. 1
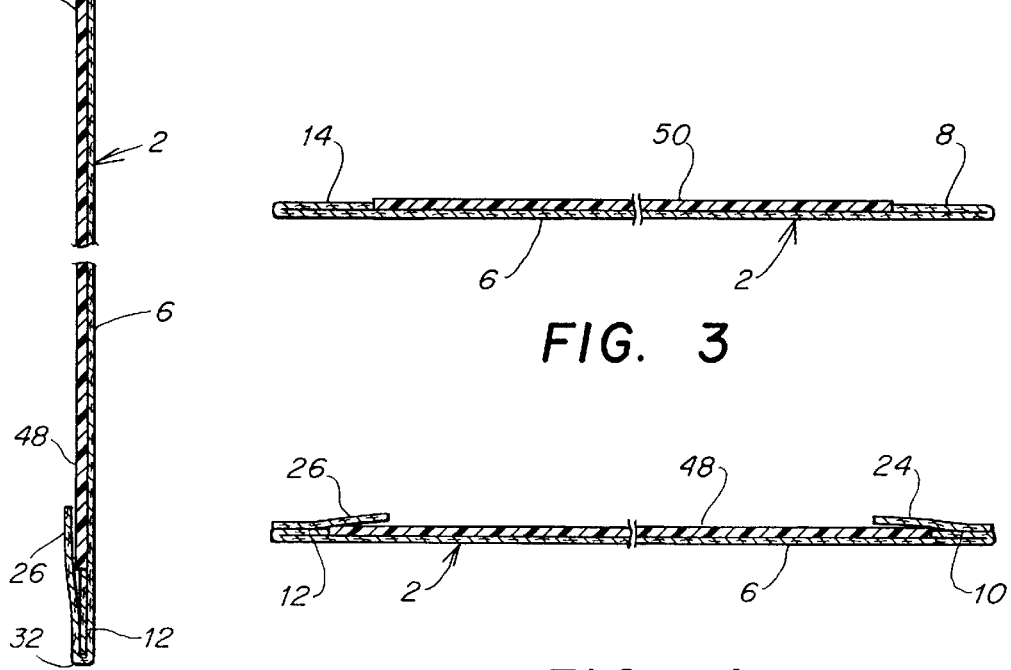
FIG. 2
FIG. 3
FIG. 4

HOLDER FOR COMPACT DISC AND THE LIKE

CROSS REFERENCE TO RELATED APPLICATION

Reference is made to U.S. patent application Ser. No. 08/576,497 filed Dec. 21, 1995, the disclosure of which is incorporated herein by reference.

BACKGROUND OF THE INVENTION

1. Field of the Invention

The present invention relates to a package, such as a holder for securely storing and transporting a compact disc, computer floppy disc and the like, for permitting the rapid insertion and removal of the disc, and for fully displaying substantially the entire face of the disc label when the disc is retained in the package.

2. Description of the Related Art

Devices for retaining a compact disc or a computer floppy disc have traditionally been constructed at least partially of plastic, and to include paperboard sleeves which obscure all or a significant portion of the disc label. These conventional compact disc holders have the drawback of not being capable of being manufactured substantially entirely by a machine.

U.S. Pat. No. 5,289,918 to Dobias et al. recognized the need for a compact disc holder which exposes the non-playing surface of the disc while the disc is in the holder. Dobias et al. further recognized the need to construct the disc holder of recyclable materials rather than plastic, and to automate the fabrication process to reduce the manual labor involved in manufacturing and the corresponding production cost.

As a proposed solution, Dobias et al. discloses a folded container constructed from a single, unitary sheet that includes a panel having two sloped surfaces each with an elliptical cutout. The elliptical cutouts are shaped so that the larger of two arcs of each ellipse is of a sufficient height and size to permit a compact disc to easily drop through at the top of the arc, which is also at the top of the sloped surface, while the descending portion of the same arc decreases in size to snap in to lock the disc in place. The smaller of the two arcs of each ellipse is sufficient to support the disc along its edge without touching a face of the disc. As a result, the panel locks the disc at four points along its outer edge.

It is desirable to form a compact disc holder starting from a single, unitary sheet of paperboard which is initially flat and then folded in a particular manner to permit full view of the disc label while the package is open, and which does not pinch the disc at four points along its outer edge, and which prevents the disc from inadvertently popping out of its retention position.

OBJECTS AND SUMMARY OF THE INVENTION

It is an object of the present invention to provide a compact disc holder which can be made of paperboard or similar materials using conventional folding equipment, such as that used in carton making.

It is a further object of the invention to produce an economical compact disc holder capable of housing a compact disc for storage and/or mailing.

It is still a further object of the invention to provide a compact disc holder wherein the compact disc is easily inserted and removed therefrom, and which can be economically manufactured.

It is yet another object of the present invention to provide a compact disk holder which overcomes inherent disadvantages of known compact disk holders.

In accordance with one form of the present invention, the compact disc holder includes a retention panel for supporting the compact disc, and a plurality of lateral engagement sections contiguous with the retention panel. The lateral engagement sections have a curved edge which substantially frictionally engages an outer edge of the compact disc to inhibit lateral movement of the disc. The package also includes disc retainment tabs contiguous with the retention panel which extend over at least a portion of the lateral engagement sections to substantially engage a portion of the disc face to retain the disc in the holder. The disc may also include a cover panel capable of being rotated over the lateral engagement sections and disc retainment tabs to further secure the disc stored therein.

A preferred form of the compact disc holder, as well as other embodiments, objects, features and advantages of the invention, will be apparent from the following detailed description of illustrative embodiments thereof, which is to be read in connection with the accompanying drawings.

BRIEF DESCRIPTION OF THE DRAWINGS

FIG. 1 is a perspective view of a compact disc holder of the present invention shown in its folded, assembled condition having a compact disk secured therein;

FIG. 2 is a sectional view of FIG. 1 taken along line 2—2;

FIG. 3 is a sectional view of FIG. 1 taken along line 3—3;

FIG. 4 is a sectional view of FIG. 1 taken along line 4—4;

DESCRIPTION OF THE PREFERRED EMBODIMENT

Figure 5:
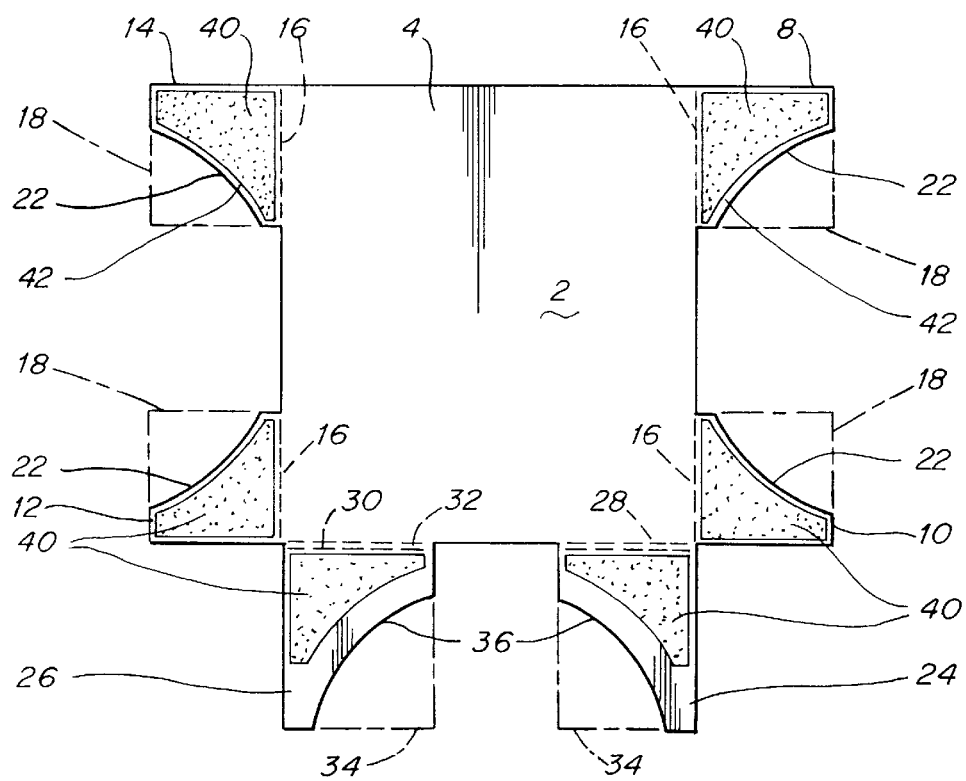
FIG. 5 is a plan view of the compact disk holder of FIG. 1 in an open pre-folded condition showing lateral engagement sections and disc retainment tabs that are folded upon a retention panel.
Figure 6:
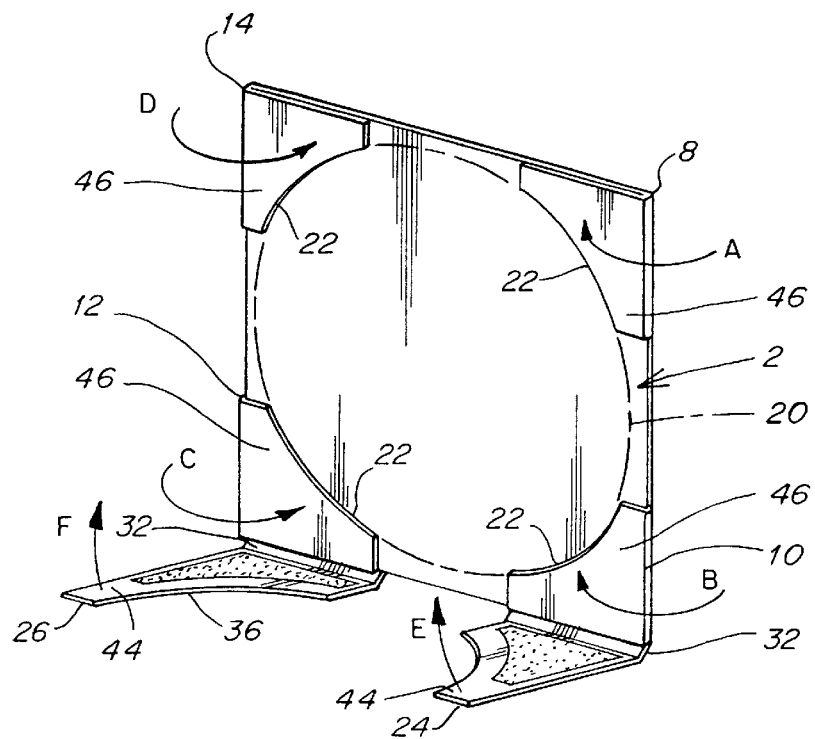
FIG. 6 is a perspective view of the compact disk holder of FIG. 5 wherein the lateral engagement sections are folded upon and secured to the retention panel.

Referring initially to FIGS. 1 through 7 of the drawings, a preferred form of the compact disc holder 1 constructed in accordance with the present invention will now be described. FIG. 1 shows the holder 1 in a folded, closed condition, and FIGS. 5 and 6 show the holder 1 in an open, unfolded condition and an open, partially folded condition, respectively. The holder 1 is preferably made of paperboard or other material that can be scored and folded using conventional cardboard carton making machinery.

Throughout the following description, the term compact disc (CD) is generally used. However, it should be clear that the invention is equally applicable to other discs, such as computer floppy discs, and the like. The description with respect to "compact discs" should not be deemed to be limiting of the present invention. In the claims, the more general term "disc" is used to encompass not only compact discs, but any disc.

As shown in FIGS. 1 through 7, the compact disc holder 1 comprises a retention panel 2 which is substantially preferably square having opposite first and second surfaces 4, 6. The disc holder 1 also includes lateral engagement sections 8, 10, 12, 14. Each lateral engagement section is proximate a corresponding corner of the retention panel 2. Preferably, two lateral engagement sections (8, 10 and 12, 14) are contiguous with the retention panel 2 along a common side (i.e., edge) of the retention panel 2 as shown in FIG. 5. The lateral engagement sections 8, 10, 12, 14 are preferably formed by generating a fold line 16 along the common edge between the retention panel and the respective lateral engagement section. The lateral engagement sections are thereafter capable of being rotated about the fold line and superposed upon at least a portion of the first surface 4 of the retention panel 2. While it is preferred that the lateral engagement sections are contiguous with the retention panel, it is foreseen that sections 8, 10, 12, 14 may be formed from material which is not contiguous with the retention panel 2.

Preferably, lateral engagement sections 8, 10, 12, 14 are cut to proper form (FIG. 5) during a stamping or cutting process wherein the entire paperboard layout which forms the holder is cut during a single machine operation. However, it is foreseen that each lateral engagement section may be initially square as shown in phantom in FIG. 5. Therefore during manufacturing, each section has an arc-like cutout 18 removed therefrom. The arc-like cutout 18 is removed from each section 8, 10, 12, 14 such that when the lateral engagement sections are rotated about the respective fold lines 16 and secured to retention panel 2, a substantially circular region 20 (shown in phantom in FIG. 6) of the retention panel will be evident for placement of a disc.

The cutout 18 preferably defines a curved edge 22 of lateral engagement section 8, 10, 12, 14. The curved edge 22 extends from a starting point that is proximate the edge that is common with the retention panel and distally located with respect to a corner of the retention panel, to a point which is substantially diagonally opposite the starting point. The curved edge 22 of each lateral engagement section preferably has a radius of curvature which is not less than, and is substantially equal to, the radius of curvature of the disc which is to be secured within the holder. As shown in FIG. 6, the arc-like cutouts are removed such that a compact disc will substantially frictionally engage each curved edge 22 to inhibit lateral movement of the disc within the holder. The arc-like cutout 18 is preferably removed, and the curved edge 22 is correspondingly formed, using the aforementioned conventional cardboard carton making machinery.

In the preferred embodiment, the disc holder 1 also includes two disc retainment tabs 24, 26 which are preferably contiguous with the retention panel 2 such that each tab shares at least a portion of a common edge with the retention panel 2 as shown in FIG. 5. In the preferred embodiment, the tabs 24, 26 are formed along a common side (i.e., edge) of the retention panel. However, it is foreseen that the tabs may be located along different sides (i.e., edges) of the retention panel. As shown in FIG. 5, the disc retainment tabs 24, 26 are formed by fold lines 28, 30 between the retention panel and each tab. The combination of the two fold lines 28, 30 defines a spine 32 therebetween, which enables the tab to be substantially rotated and superposed over at least a portion of the retention panel 2. The distance between fold lines 28, 30 substantially corresponds to the thickness of lateral engagement sections 10, 12. Spine 32 acts as a spacer so that lateral engagement section 10, 12 can be located between the corresponding disc retainment tab 24, 26 and the retention panel 2, as will be described in detail below, as shown in FIG. 6, and more clearly shown in FIG. 7. While spine 32 has been shown in the drawings and described above, it is foreseen that each tab 24, 26 may include only one fold line. However, even without spine 32, tabs 24, 26 are capable of being superposed over at least a portion of retention panel 2.

Similar to that described above regarding the formation of lateral engagement sections 8, 10, 12 and 14, the disc retainment tabs 24, 26 are preferably cut to their required form during a single cutting process wherein the entire paperboard layout which forms the holder is cut during a machine operation. However, it is foreseen that each disc retainment tab may be initially square as shown in phantom in FIG. 5. Therefore during manufacturing, the tabs have an arc-like cutout 34 removed therefrom. The arc-like cutout 34 is removed so as to define a curved edge 36.

Figure 7:
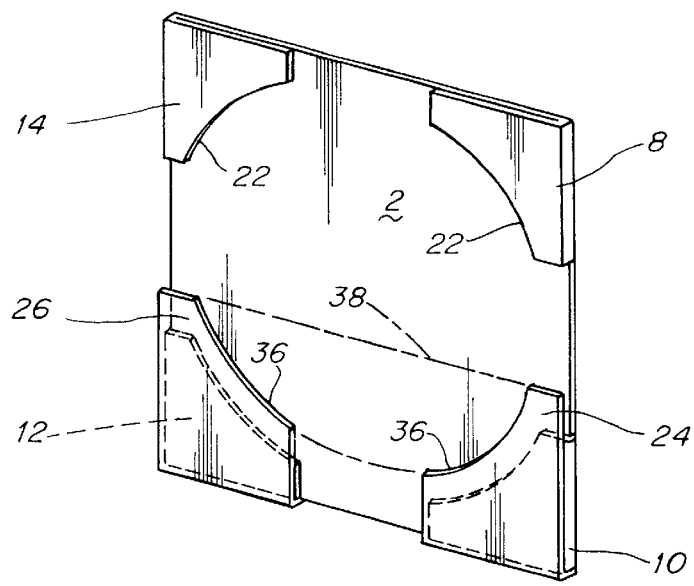
FIG. 7 is a perspective view of the compact disc holder of the present invention shown in FIG. 6 in its fully folded condition wherein the disc engagement tabs are folded upon and secured to corresponding lateral engagement sections.

When the tabs are rotated about fold lines 28, 30 and spine 32, a substantially semi-circular region 38 (shown in phantom in FIG. 7) of the retention panel will be defined. The curved edge 36 of the tabs 26, 28 preferably has a radius of curvature which is less than the radius of curvature of the disc which is to be secured in the compact disc holder. The curved edge 36 extends from a starting point that is proximate the edge that is common with the retention panel and distally located with respect to a corner of the retention panel, to a point which is substantially diagonally opposite the starting point. As shown in FIGS. 1 and 7, the arc-like cutouts 34 are removed from the tabs such that at least a portion of the tab defined by the curved edge 36 will extend beyond a corresponding lateral engagement section 10, 12. By extending the curved edge beyond the lateral engagement section, the tab will engage the compact disc so that it will be retained within the holder.

After the curved edges 22, 36 and fold lines 16, 28, 30 have been formed, the disc package 1 is constructed by substantially rotating lateral engagement sections 8, 10, 12 and 14 about corresponding fold lines 16. The lateral engagement sections are rotated onto the first surface 4 of the retention panel 2 as shown by arrows A, B, C, D in FIG. 6. The lateral engagement sections 8, 10, 12, 14 are secured to the first surface of retention panel 2 by means of an adhesive 40 (such as glue) applied on an inside surface 42 of each lateral engagement section or to the first surface of the retention panel itself. Thereafter, tabs 24, 26, preferably having adhesive applied on inside surface 44, are rotated about fold lines 28, 30 and spine 32 onto the outer surface 46 of tabs 10, 12 respectively as shown in FIG. 6 by arrows E and F. It is foreseen that the adhesive may also be applied in another manner on alternate or complementary surfaces to achieve the same result.

The adhesive 40 is of sufficient strength to maintain sections 8, 10, 12, 14 in a folded condition (and in contact with the retention panel 2), and to maintain tabs 24, 26 in a folded condition and in substantial contact with corresponding sections 10, 12. In lieu of an adhesive, other forms of fastening may be employed such as stapling or engagable hook and loop material. However, adhesive is the preferred method of securement.

Preferably, the curved edge 22 of the lateral engagement sections 8, 10, 12, 14 have curvatures which generally follow the curvature of the circular peripheral edge of the disc. In the preferred embodiment, there is no space between the circular peripheral edge of the disc and the curved edge 22 so as to provide structural integrity to the overall disc holder when a disc is retained therein. All of the curved edges are preferably die-cut, in a conventional manner. The various fold lines are also formed in a conventional manner using a conventional machine for forming such fold lines, for example, as used in a carton-making apparatus.

While the arc-like cutout of the disc retainment tab has been described above, disc retainment tab 24, 26 need not necessarily include curved edge 36. Instead, the edge could have another shape. However, the curved edge 36 is preferred because a substantial portion of the periphery of the disc is engaged by the tabs with minimal obstruction during disc insertion and removal.

Having described the compact disc holder structure, the operation and use of the holder 1 will now be described. Referring again to FIG. 1, the compact disc is positioned adjacent to and substantially parallel to the holder. The disc is inserted into the holder 1 by moving the disc in the direction of arrow G so that the lower portion 48 of the disc fits under at least a portion of tabs 24, 26 and so that the curved edge 22 of lateral engagement section 10, 12 substantially frictionally engage the peripheral edge of the disc. FIG. 4, which is a cross-section of FIG. 1, illustrates the position of the disc in the holder after manipulation as indicated by arrow G.

After reaching the position beneath tabs 10, 12, upper portion 50 of the disc is pushed in a direction of arrow H so that the curved edge 22 of lateral engagement section 8, 14 substantially frictionally engage the peripheral edge of the disc. FIG. 3, which is a cross section of the relevant portion of FIG. 1, illustrates the position of the disc in the holder after manipulation as indicated by arrow H.

When the disc is mounted in the holder as shown in detail in FIG. 1, the lateral engagement sections which restrict a lateral movement of the disc also act as spacer members to sufficiently space the top surface of the disc from the inner surface 44 of the disc retainment tab 24, 26. It is foreseen that the disc holder 1 of the present invention may house a plurality of compact discs if the thickness of lateral engagement sections 8, 10, 12, 14 is sufficient to accommodate more than one disc. However, the holder is preferably designed to retain only one disc.

The compact disc is removed from the holder 1 by forcing the upper portion 50 of the disc outward in the direction of arrow I so as to disengage the curved edge 22 of lateral engagement sections 8, 14. Then, the disc is lifted upward in a direction of arrow J so as to release the disc from retainment behind tabs 24, 26, thereby enabling the disc to be easily removed from the package 1.

Figure 8:
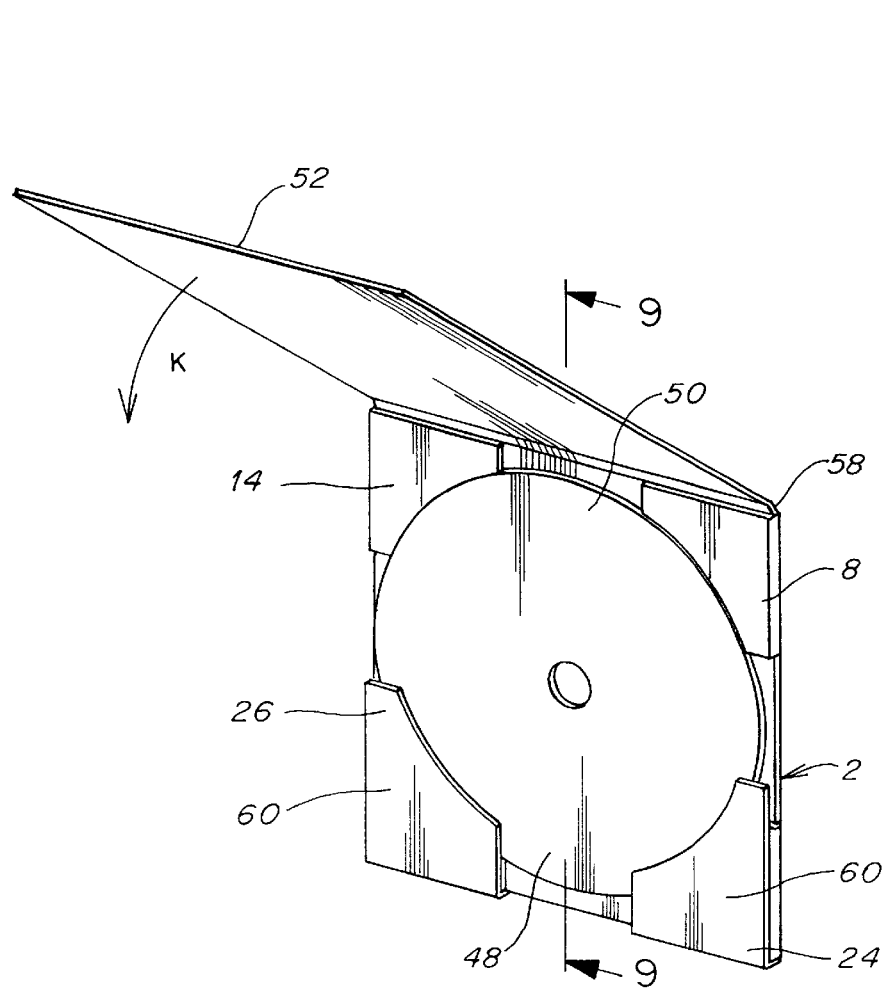
FIG. 8 is an perspective view of an alternative embodiment of the present invention wherein the compact disk holder includes a cover panel which is folded over the retention panel to protect the face of the compact disk stored therein.
Figure 9:
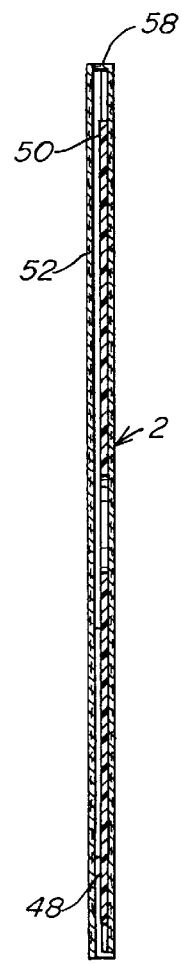
FIG. 9 is a sectional view of FIG. 8 taken along line 9—9 with the cover panel closed.
Figure 10:
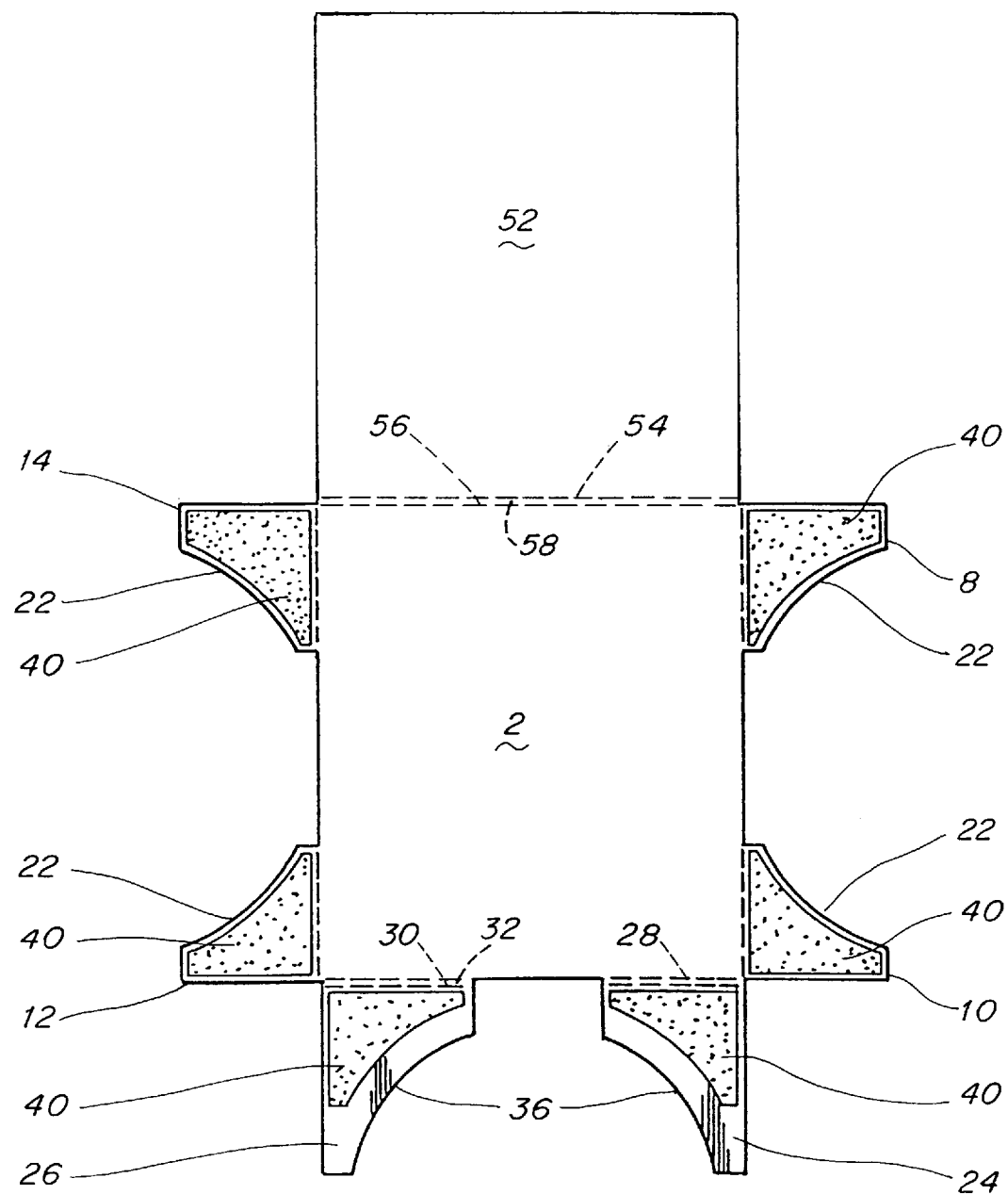
FIG. 10 is a plan view of the compact disk holder of FIG. 8 in an open pre-folded condition showing the lateral engagement sections, disc retainment tabs and cover panel that are folded upon a retention panel.

Referring now to FIGS. 8 through 10 a modified arrangement of the compact disc holder 1 is shown. The modified disc holder is substantially the same as the embodiment shown in FIGS. 1 through 7, expect that the holder further comprises a cover panel 52. The cover panel is preferably contiguous with retention panel 2. The cover panel 52 is preferably substantially the same size as retention panel 2. The cover panel and retention panel preferably share a common edge as shown in FIGS. 8 through 10. The cover panel is preferably formed by the generation of fold lines 54, 56 between the cover panel 52 and the retention panel 2 along their commonly connected edge. The fold lines 54, 56 are spaced apart to define a spine 58 therebetween which acts as a spacer and a stiffening member to make the package more rigid and to prevent damage to the disc stored therein. The spine 58 is formed to provide sufficient spacing to permit the cover panel to be folded and contact the outer surface 60 of tabs 24, 26 when the panel is rotated as indicated by arrow K in FIG. 8.

As is clear from the above description, the height of the respective spines for forming the cover panel and the disc retainment tabs can be varied to desired measurements corresponding to the thickness and number of layers of material, and as the material gauge varies. However, while spine 58 has been shown in FIGS. 8-10 and described above, it is foreseen that the cover panel 52 may include only one fold line. However, even without spine 58, cover panel 52 is capable of being rotated and superposed over retention panel 2.

The compact disc holder of the present invention enables a user to easily insert and remove a compact disc. The disc, while having its label exposed, is securely protected even though the holder is made of paperboard or similar materials using conventional carton making machinery.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A disc package for retaining a disc having an edge defining a radius of curvature, comprising:

a retention panel defining a plane having first and second surfaces, the first surface of said retention panel being in substantial contact with a face of said disc when the disc is inserted within said disc package;

a plurality of lateral engagement sections superposed with respect to the first surface of the retention panel, each of the plurality of lateral engagement sections having a curved edge which substantially corresponds to at least a portion of said disc edge for accommodating insertion of said disc, engagement of said disc edge and lateral retention of said disc, at least first and second lateral engagement sections of said plurality of lateral engagement sections being noncontiguous with one another such that at least a first portion of said edge of said disc is proximate to and unengaged with said first and second lateral engagement sections for ease of removal of said disc from said disc package; and a disc retainment tab being superposed with respect to at least one of said plurality of lateral engagement sections, the disc retainment tab being non-planar with respect to the retention panel plane, at least a portion of said disc retainment tab extending over at least a portion of the first surface of the retention panel to operatively engage at least a portion of a surface of said inserted disc and retain the disc therein.

2. A disc package as defined by claim 1, wherein the plurality of lateral engagement sections are contiguous with the retention panel.

3. A disc package as defined by claim 2, wherein the plurality of lateral engagement sections share at least a portion of a common edge with said retention panel, said common edge having a fold line for folding the lateral engagement section into substantial contact with said retention panel first surface.

4. A disc package as defined by claim 1, wherein the disc retainment tab is contiguous with the retention panel.

5. A disc package as defined by claim 4, wherein the disc retainment tab shares at least a portion of a common edge with said retention panel, said common edge having a fold line for folding the disc retainment tab into substantial engagement with at least one of said lateral engagement sections.

6. A disc package as defined by claim 5, the disc retainment tab having an edge, wherein the portion of said disc retainment tab which extends over the first surface of the retention panel includes said edge.

7. A disc package as defined by claim 6, wherein said edge of said disc retainment tab is curved, and wherein the curved edge has a radius of curvature which is less than the radius of curvature of said disc edge.

8. A disc package as defined by claim 1 further comprising:
a cover panel being contiguous with said retention panel and sharing with said retention panel a common edge, said common edge having a fold line for folding the cover panel into substantial superposition with said retention panel, said cover panel covering at least a portion of the disc retained in the package.

9. A disc package as defined by claim 1, wherein one of said plurality of lateral engagement sections is interposed between the retention panel and the disc retainment tab.

10. A disc package as defined by claim 1, wherein the disc package comprises four lateral engagement sections and two disc retainment tabs.

11. A disc package for retaining a disc having a side peripheral edge, comprising:
a retention panel defining a plane having first and second surfaces, the first surface of said retention panel being in substantial contact with a face of said disc when the disc is inserted within said disc package;
a plurality of lateral engagement sections superposed with respect to the first surface of the retention panel, each of the plurality of lateral engagement sections having an edge which substantially corresponds to said side peripheral edge for accommodating insertion of said disc, engagement of said disc edge and lateral retention of said disc, the plurality of lateral engagement sections being contoured so as to contact the side peripheral edge of the disc so as to frictionally retain the disc in the package, at least first and second lateral engagement sections of said plurality of lateral engagement sections being noncontiguous with one another such that at least a first portion of said edge of said disc is proximate to and unengaged with said first and second lateral engagement sections for ease of removal of said disc from said disc package.

12. A disc package as defined in claim 11, further comprising:
a disc retainment tab being superposed with respect to one of said plurality of lateral engagement sections, the disc retainment tab being non-planar with respect to the retention panel plane, at least a portion of said disc retainment tab operatively engaging at least a portion of said inserted disc to retain the disc therein.

13. A disc package as defined by claim 11, wherein the plurality of lateral engagement sections are contiguous with the retention panel.

14. A disc package as defined by claim 13, wherein the plurality of lateral engagement sections share at least a portion of a common edge with said retention panel, said common edge having a fold line for folding the lateral engagement section into substantial contact with said retention panel first surface.

15. A disc package as defined by claim 11 further comprising:
a cover panel being contiguous with said retention panel and sharing with said retention panel a common edge, said common edge having a fold line for folding the cover panel into substantial superposition with said retention panel, said cover panel covering at least a portion of the disc retained in the package.

16. A disc package as defined by claim 11, wherein the disc package comprises four lateral engagement sections and two disc retainment tabs.

17. A disc package as defined by claim 11, wherein the plurality of lateral engagement sections further comprises:
third and fourth lateral engagement sections which are discontiguous with one another such that at least a second portion of said edge of said disc is unengaged with said third and fourth lateral engagement sections for ease of removal of said disc from said disc package.

18. A disc package as defined by claim 17, wherein the first and second unengaged portions of said edge of said disc are substantially oppositely located about said edge of said disc.

19. A disc package as defined by claim 11, wherein:
the first and fourth lateral engagement sections are discontiguous with one another such that at least a third portion of said edge of said disc is unengaged with said first and fourth lateral engagement sections for ease of removal of said disc from said package.

20. A disc package as defined by claim 19 wherein:
the second and third lateral engagement sections are discontiguous with one another such that at least a fourth portion of said edge of said disc is unengaged with said second and third lateral engagement sections for ease of removal of said disc from said package.

21. A disc package as defined by claim 20 wherein the third and fourth unengaged portions of said edge of said disc are substantially oppositely located about said edge of said disc.

22. A disc package as defined by claim 1, wherein the plurality of lateral engagement sections further comprises:
third and fourth lateral engagement sections which are discontiguous with one another such that at least a second portion of said edge of said disc is unengaged with said third and fourth lateral engagement sections for ease of removal of said disc from said disc package.

23. A disc package as defined by claim 22, wherein the first and second unengaged portions of said edge of said disc are substantially oppositely located about said edge of said disc.

24. A disc package as defined by claim 22, wherein:
the first and fourth lateral engagement sections are discontiguous with one another such that at least a third portion of said edge of said disc is unengaged with said first and fourth lateral engagement sections for ease of removal of said disc from said package.

25. A disc package as defined by claim 24 wherein:
the second and third lateral engagement sections are discontiguous with one another such that at least a fourth portion of said edge of said disc is unengaged with said second and third lateral engagement sections for ease of removal of said disc from said package.

26. A disc package as defined by claim 25 wherein the third and fourth unengaged portions of said edge of said disc are substantially oppositely located about said edge of said disc.

27. A disc package for retaining a disc having an edge defining a radius of curvature, comprising:

a retention panel defining a plane having first and second surfaces, the first surface of said retention panel being in substantial contact with a face of said disc when the disc is inserted within said disc package;

a plurality of lateral engagement sections superposed with respect to the first surface of the retention panel, each of the plurality of lateral engagement sections having a curved edge which substantially corresponds to at least a portion of said disc edge for accommodating insertion of said disc, engagement of said disc edge and lateral retention of said disc, said plurality of lateral engagement sections including at least first, second, third and fourth lateral engagement sections being discontiguous with one another such that at least a first portion of said edge of said disc is unengaged with said first and second lateral engagement sections, the third and fourth lateral engagement sections being discontiguous with one another such that at least a second portion of said edge of said disc is unengaged with said third and fourth lateral engagement sections; and disc retainment tab being superposed with respect to at least one of said plurality of lateral engagement sections, the disc retainment tab being non-planar with respect to the retention panel plane, the disc retainment tab corresponding one of said plurality of lateral engagement sections, at least a portion of said disc retainment tab extending over at least a portion of the first surface of the retention panel to substantially operatively engage at least a portion of a surface of said inserted disc and retain the disc therein.

28. A disc package as defined by claim 27, wherein the first and second portions of said edge of said disc are substantially oppositely located about said disc.

* * * * *